US009489284B2

(12) United States Patent
Ghica et al.

(10) Patent No.: US 9,489,284 B2
(45) Date of Patent: Nov. 8, 2016

(54) DEBUGGING METHOD AND COMPUTER PROGRAM PRODUCT

(75) Inventors: Alexandru Ghica, Bucharest (RO); Razvan Ionescu, Bucharest (RO); Radu-Victor Sarmasag, Targoviste (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/375,959

(22) PCT Filed: Feb. 29, 2012

(86) PCT No.: PCT/IB2012/050948
§ 371 (c)(1),
(2), (4) Date: Jul. 31, 2014

(87) PCT Pub. No.: WO2013/128238
PCT Pub. Date: Sep. 6, 2013

(65) Prior Publication Data
US 2015/0026523 A1     Jan. 22, 2015

(51) Int. Cl.
*G06F 9/44* (2006.01)
*G06F 11/36* (2006.01)
*G06F 11/07* (2006.01)

(52) U.S. Cl.
CPC ........ *G06F 11/3636* (2013.01); *G06F 11/0775* (2013.01)

(58) Field of Classification Search
CPC ........... G06F 11/3636; G06F 11/3688; G06F 11/3692
See application file for complete search history.

(56) References Cited

U.S. PATENT DOCUMENTS

| | | | |
|---|---|---|---|
| 4,005,405 A | 1/1977 | West | |
| 6,611,924 B1 * | 8/2003 | Warmink | G06F 11/3624 714/38.12 |
| 7,506,217 B2 | 3/2009 | Borin et al. | |
| 7,865,778 B2 | 1/2011 | Duesterwald et al. | |
| 2002/0188926 A1 * | 12/2002 | Hearnden | G06F 17/30985 717/100 |
| 2004/0267713 A1 * | 12/2004 | Chaudhuri | G06F 17/30985 |
| 2005/0041675 A1 * | 2/2005 | Trostle | H04L 29/12009 370/401 |
| 2005/0060647 A1 * | 3/2005 | Doan | G06F 17/30557 715/205 |
| 2005/0132338 A1 | 6/2005 | Kalra | |

(Continued)

FOREIGN PATENT DOCUMENTS

EP         0404068 A3    12/1990

OTHER PUBLICATIONS

Christopher Larosa et al: "Frequent Pattern Mining for Kernel Trace Data", SAC'08, Mar. 16-20, 2008, Fortaleza, Ceara, Brazil, pp. 1-6.

(Continued)

*Primary Examiner* — Chameli Das (57) ABSTRACT

A method for debugging a computer program is proposed. The method includes a step of running at least part of the computer program on a computer, thereby prompting the computer to execute a sequence of instructions and to generate a trace corresponding to the executed sequence of instructions. When the program has generated an exception, selecting a set of one or more exception strings on the basis of the trace, so that each of the exception strings is a unique substring of the trace. The exception strings are indicated to a user or to a debugging tool. The set of exception strings may notably include the ultimate shortest unique substring of the trace. A computer program product is also described.

15 Claims, 3 Drawing Sheets

(56) References Cited

U.S. PATENT DOCUMENTS

| | | | |
|---|---|---|---|
| 2006/0101416 A1* | 5/2006 | Callahan, II | G06F 11/3404 717/128 |
| 2006/0242627 A1* | 10/2006 | Wygodny | G06F 11/3636 717/128 |
| 2006/0294423 A1 | 12/2006 | Degtyar et al. | |
| 2007/0112714 A1* | 5/2007 | Fairweather | G06F 8/427 706/46 |
| 2008/0313504 A1* | 12/2008 | Wedel | G06F 11/3636 714/45 |
| 2009/0132861 A1* | 5/2009 | Costa | G06F 11/0748 714/45 |
| 2009/0328006 A1 | 12/2009 | Naruse | |
| 2010/0125834 A1 | 5/2010 | Matic | |
| 2010/0169285 A1* | 7/2010 | Bansal | G06F 11/3612 707/688 |
| 2011/0145800 A1* | 6/2011 | Rao | G06F 11/323 717/133 |
| 2011/0314337 A1* | 12/2011 | Sinha | G06F 11/3624 714/37 |
| 2012/0144494 A1* | 6/2012 | Cole | G02B 5/3083 726/25 |
| 2015/0234730 A1* | 8/2015 | Puthuff | G06F 11/3636 717/128 |

OTHER PUBLICATIONS

Sudheendra Hangal et al: "Tracking Down Software Bugs Using Automatic Anomaly Detection", 1CSE'02, May 19-25, 2002, Orlando, Florida, USA, pp. 291-301.

Rui Abreu: "Spectrum-based Fault Localization in Embedded Software", Electrical Engineering, Mathematics and Computer Science, Nov. 4, 2009, ISBN 9789079982042, pp. 1-200.

International Search Report and Written Opinion correlating to PCT/IB2012/050948 dated Nov. 29, 2012.

Guo, L. et al., "Accurately Choosing Execution Runs for Software Fault Localization", http://link.springer.com/chapter/10.1007%2F11688839_7, 15th International Conference on Compiler Construction, Lecture Notes in Computer Science, vol. 3923, Mar. 30, 2006, Vienna, Austria, pp. 80-95.

Zeller, A., "Simplifying and Isolating Failure-Inducing Input", IEEE Transactions on Software Engineering, vol. 28, Issue 2, Feb. 2002, pp. 183-200.

* cited by examiner

DEBUGGING METHOD AND COMPUTER PROGRAM PRODUCT

FIELD OF THE INVENTION

This invention relates to a method for debugging a computer program and to a computer program product.

BACKGROUND OF THE INVENTION

Program testing and error elimination is an important part in the development process of virtually any computer program. A program developer usually runs the program on a computer and analyzes the computer's output to verify whether the program behaves as expected and to identify possible errors (bugs). The programmer may then modify the program in order to remove such bugs. This is known as debugging.

Various debugging tools are known in the art. A debugging tool or debugger is a hardware or software device which is designed to assist the programmer in finding bugs in a computer program. For example, a debugger may enable the programmer to monitor the values of variables during a run of the computer program. Furthermore, a debugger may indicate the instruction in the source code of the program at which an exception has occurred during a run of the program. An exception may indicate, represent, or can be any kind of error that is not expected to happen during normal execution of the program. Exceptions may include, for example, forbidden mathematical operations such as division by 0, memory errors such as heap or stack overflow errors, and segmentation faults.

Many of the most common methods of debugging a program involve analyzing a trace that is generated by the computer when running the program. A trace may be defined as any collection of data that is accumulated during the execution of a program. A trace may, for example, include the values of a variable at different stages of the program flow. Alternatively or in addition, the trace may indicate the names of instructions that are executed during the program flow. Such instructions may be indicated in the trace to various degrees of precision. For example, if the program has been written in a modular manner involving modules such as function or subroutines, the program may be designed, for example, to write out only the names of higher level modules but not the names of the lower level modules contained in or called by the high level modules. For instance, a program may be configured such that the name of a subroutine A is appended to the trace when the subroutine is called by a processor, whereas the name of a subroutine B included in subroutine A is not appended to the trace when subroutine B is executed as part of subroutine A. Alternatively, a computer may be configured such that the names of modules belonging to various modular levels are accounted for in the trace. By analyzing the trace, the programmer may reconstruct the program flow that occurred when the program was executed on a computer.

SUMMARY OF THE INVENTION

The present invention provides a method for debugging a computer program and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 1:
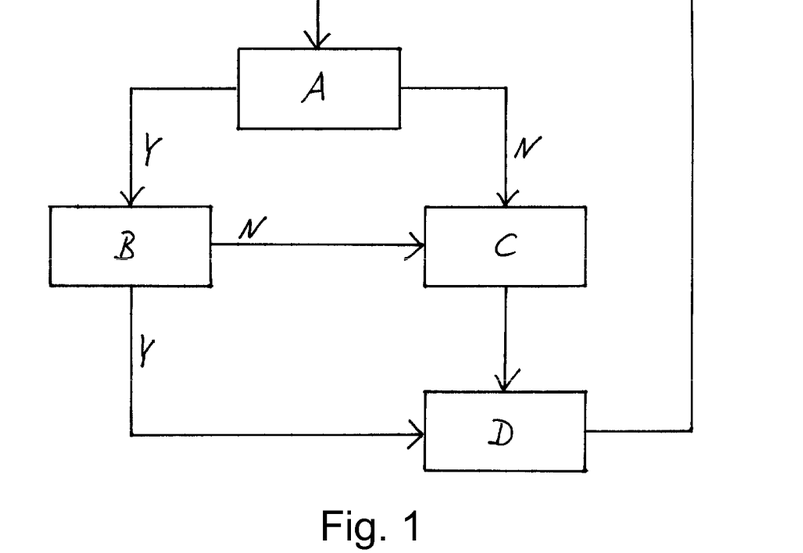
FIG. 1 schematically shows a chart of an example of an embodiment of a computer program.

The chart in FIG. 1 illustrates an example of a computer program. In this example, the computer program comprises instructions A, B, C, and D. Generally, a computer program may, of course, comprise many more instructions. An instruction may be an elementary instruction or a more complex instruction that comprises several or even a very large number of elementary instructions. An elementary instruction may be, for example, an instruction that can be executed by a processor within a single clock cycle. The program shown in FIG. 1 starts with instruction A. The program flow then continues either with instruction B or instruction C. For example, instruction A may include one or more instructions for evaluating a Boolean function in dependence on one or more variables. Such variables may include, for example, input variables or internal data residing in a memory unit, or both. For instance, if the result of the Boolean function is yes, the program flow may proceed with instruction B, and if the Boolean function returns no, the program flow may proceed with instruction C. From instruction B, the program flow may proceed with either instruction C or instruction D. From instruction D, the program flow may return to instruction A.

A single cycle or run of the program may thus consist of the following instruction sequences: ABD, ABCD, and ACD. In this example, there are thus three different instruction sequences that may occur when the program is executed on a computer. More complex programs may involve a far greater number of different possible instruction sequences.

The program or the computer on which the program is run, or both, may be configured to generate a trace in the course of running the program on the computer. For instance, a trace function may be integrated in the program itself or by means of a dedicated trace unit, e.g. implemented in hardware. For example, the trace function implemented in software or in hardware or in both may be configured such that an instruction identifier is appended to the trace when the computer starts to execute an instruction in the program. The trace may thus reflect the chronological order in which the various instructions of the program were executed. Generally, an instruction identifier or literal may, for example, be an alphanumerical constant and/or character or a combination of characters that is assigned to and/or defined to represent a particular instruction. The identifier may, for example, be the name of an instruction as defined in a source code of the program. The identifier may, for instance, be a function name or a subroutine name. A run of the example program shown in FIG. 1 may thus yield, for example, the following trace: ABDACDABCD. This example trace indicates that the instructions A, B, C, and D were executed in this order, namely, ABDACDABCD. This example trace thus represents three cycles or loops, each cycle starting with the same first instruction A. More specifically, the first, second, and third cycle comprise, in this example, the sequences ABD, ACD, and ABCD, respectively. A single run of the program may, of course, involve more than three cycles.

It has been found that an exception, for example, an overflow error, can often be attributed to a particular sequence of instructions in the sense that this particular sequence produces the exception, whereas other sequences do not produce the exception. For example, still considering the flow chart in FIG. 1, the program may contain a bug that results in an exception only when the computer executes the sequence of instructions ABCD, whereas the sequences ABD and ACD do not result in an exception. In other words, the bug in this example may be attributed to the sequence ABCD.

Considering the example sequence ABCD more in detail, it may further be observed that it contains instructions and sequences of instructions which have been executed before without producing the exception. In the present example, the sequence ABCD contains the following subsequences which have been executed before without generating an exception: AB and CD. Indeed, the sequences AB and CD appear in the trace before the final sequence ABCD. In the present example, it is therefore legitimate to focus on the sequence BC in an attempt to find an error in the program.

However, it has been found that an error may very well be due to a combination of factors involving not only the subsequence, e.g. combination BC, but, for example, the whole sequence ABCD or even earlier instructions. For instance, it might turn out that only the above-indicated sequence ABDACDABCD produces the exception, whereas the sequence ABCD when executed only once or repeatedly does not produce the exception. Nevertheless, it has been found that the shortest unique subsequences contained in the trace have a relatively high likelihood of being the cause of an exception generation. It has further been found that the ultimate shortest unique subsequence in the trace has a high likelihood of being the cause, because it is more likely that the error which causes the exception is in an instruction near the end of the instruction sequence, i.e., in an instruction that was executed soon before the exception occurred. For example, the trace introduced above contains the following shortest unique subsequences: BD, AC, and BC. Of these subsequences, BC is the last or ultimate one, and therefore, the probability that BC contributes to the exception may be higher compared to BD and AC.

In the present description, a subsequence is understood to be a first sequence formed of successive elements of a second sequence, wherein the elements of the first sequence appear in the same order as in the second sequence. This definition differs from the usual mathematical definition of a subsequence in that it requires the elements of the subsequence to be successive elements of the second sequence. Thus, a subsequence as defined here is what is commonly known as a substring. In order to avoid any possible confusion with the usual mathematical concept of a subsequence, the expression "substring" will be used in the following. A sequence may also be referred to a string. Furthermore, an instruction or an instruction identifier may be referred to as a literal. For example, the sequence ABCD of instructions A, B, C, and D is equivalent to the string ABCD of literals A, B, C, and D. Furthermore, a distinction between an executed sequence of instructions and a corresponding trace reflecting that sequence of instructions is not necessarily made, because there is a one-to-one relationship between the executed sequence of instructions and the corresponding trace. Generally, a sequence, subsequence, string, or substring may be considered to represent one or more executed instructions, which may be represented by literals and/or instruction identifiers and/or be ordered according to their order of execution and/or chronologically. It may be considered that a sequence, subsequence, string, or substring represents a trace or at least part of a trace of an executed computer program. In particular, a trace may be represented by a sequence or string of literals or instruction identifiers.

Figure 2:
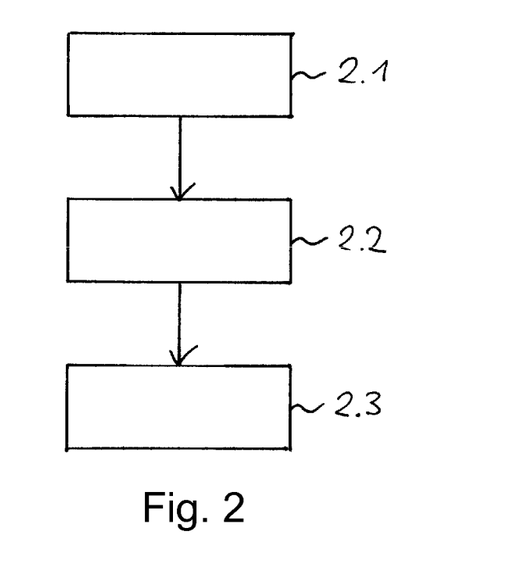
FIG. 2 shows a flow chart of an example of a method for debugging a computer program.

Referring now to FIG. 2, a method for debugging a computer program is described. The method may comprise running at least part of the computer program on a computer, i.e. by an apparatus able to execute the instructions contained in the computer program (block 2.1), determining a set of one or more exception strings (block 2.2), and indicating the exception strings to a user or to a debugging tool (block 2.3). By running at least part of the computer program (block 2.1), the computer may be prompted to execute a sequence of instructions and to generate a trace corresponding to the executed sequence of instructions. The trace may be a string of literals, each literal corresponding to one of these instructions. Each literal may, for example, be provided by a single character, a string of characters, or an alphanumerical constant. It is noted that the trace may be part of a larger trace or part of other output data produced by the computer when running the program or part of the program.

When the program has generated an exception, a set of one or more exception strings may be determined by the computer on the basis of the trace, wherein each exception string is a unique substring of the trace.

In this context, a unique substring is a substring of the trace which appears in the trace only once. For instance, the example trace ABDACDABCD contains the following unique substrings: BD, AC, BC, and all substrings of the trace comprise at least one of these shortest unique substrings. It is noted that a string having a unique substring is also unique. A unique substring which contains no unique substring except itself is referred to as a shortest unique substring or, equivalently, as an elementary unique substring. An elementary unique substring is thus elementary in the sense that none of its true substrings is unique. A true substring of a given string is a substring of that string which is shorter than the given string itself.

The exception strings may then be indicated to a user or to a debugging tool. For example, the exception strings may indicated to a user by outputting at a user interface in a for humans perceptible form, such as visually on a display. The exception strings may for instance be indicated to a debugging tool by transmitting them as signals of a type the debugging tool is able to receive and process further. The user or the debugging tool is thus provided with information indicating at least one exception string. Each exception string corresponds to a unique substring within the executed sequence of instructions and thus to a potential source of error in the program. The programmer is thus enabled to focus specifically on portions of his source code or hardware which implement the instructions that appear in the exception strings, and for example modify or adapt the source code or hardware to avoid the exception from occurring or to handle the exception in a manner that is acceptable for the specific application, such as execution of an error-handling routine.

The exception strings may, notably, be determined such that an exception string consists of a shortest unique substring in the trace. In the example trace introduced above with reference to FIG. 1, the shortest unique substrings are BD, AC, and BC. Indeed, all other unique substrings of that trace, e.g., ACD, are longer than these shortest unique substrings. Furthermore, the set of exception strings may exclude any string that is not a shortest unique substring. It has been found that indicating only the shortest unique substrings to the user allows to reduce the amount of information which the user or the debugging tool has to cope with and provides the user or the debugging tool only with non-trivial information.

The set of exception strings may, notably, be determined such that an exception string consists of the ultimate shortest unique substring of the trace. The ultimate shortest unique substring of the trace corresponds to the very last shortest sequence of instructions that was executed before the exception and which was not executed before. It may be considered reasonable to assume that among all shortest unique substrings of the trace, the ultimate shortest unique substring is the one with the highest probability of contributing to or causing the exception. Indicating the ultimate shortest unique substring of the trace to the user or to the debugging tool may therefore be particularly advantageous. Referring again to the example trace introduced above in reference to FIG. 1, the ultimate shortest unique substring is the string BC, corresponding to instruction B followed by instruction C.

The trace may be the only input data for determining one or more exception strings. However, depending on circumstances, additional data or information may be taken into account. For example, the one or more exception strings may be determined on the basis of the trace that has been considered so far, that is, the trace of a run of the program resulting in an exception, and a trace of another run of the same program in which the exception does not occur. The set of "suspicious" substrings may thus be reduced. More generally, the set of exception strings may be determined by considering, in addition to the trace associated with the exception, one or more safe strings. A safe string in this context is a sequence of instruction identifiers which corresponds to a sequence of instructions that is assumed to be safe in the sense that this instruction sequence does not produce the exception. In other words, the set of one or more exception strings may be determined on the basis of the trace and on the basis of one or more additional strings such that none of the exception strings is a substring of any one of the additional strings. Each additional string may be a safe string, or some other string introduced to exclude certain strings from the set of exception strings.

If the set of exception strings contains more than one exception string, the order in which the exception strings appear in the trace may be indicated to the user or to the debugging tool. For example, considering again the example trace ABDACDABCD introduced in reference to FIG. 1, the shortest unique substrings BD, AC and BC may be determined to be exception strings and indicated in this order so that the user or the debugging tool will know that BC is the ultimate and, therefore, the most suspicious one among the shortest unique substrings BD, AC, and BC. Generally, the order may be indicated explicitly, for example, by numbering the exception strings in accordance with the order in which they appear in the trace, or implicitly by indicating them in the order of their appearance in the trace. For example, the exception strings may be presented in the form of an ordered list.

For each or at least for some of the exception strings, a context string may be determined and the thus determined context strings may be indicated to the user or to the debugging tool. In this respect, a context string of an exception string is a true substring of the trace and contains the respective exception string as a true substring. In other words, the respective exception string is a true substring of its associated context string, and the associated context string is a true substring of the trace. The thus defined context strings may be presented to the user or the debugging tool along with the respective exception strings contained therein. For example, a context string may be defined as an exception string in conjunction with one or more preceding literals and one or more succeeding literals. The context strings may, for example, be indicated on a screen or monitor or other kind of display with the exception string contained in a specific context string formatted differently from the rest of the context string. For example, each context string may be presented as a character chain consisting of a first chain formatted in a first color, followed by the exception string formatted in a second color, followed by a terminal portion formatted in the first color. For example, the ultimate shortest unique substring BC of the trace ABDACDABCD may be indicated along with the literal preceding the exception string BC and the literal D succeeding the exception string BC. In this example, the context string is ABCD. A and D may be formatted, for example, in black, while the exception string BD is shown in red. The programmer is thus enabled to see in which context the exception string appears in the trace.

As mentioned above in reference to FIG. 1, the program may be repetitive. In this case—but not necessarily restricted to this case—the trace may comprise a succession of one or more principle substrings. Each principle substring may start with an initial literal which is the same for all principle substrings and which appears in each principle substring only at the beginning of the respective principle substring. For example, the trace ABDACDABCD is a succession of the following principle substrings: ABD, ACD, and ABCD, wherein each principle substring starts with the same initial literal A, wherein A appears in each principle substring only at the beginning of the respective principle substring. The one or more exception strings may then be selected such that each exception string is a substring of one of the principle substrings. In other words, any string that extends across more than one principle substring may be excluded from the set of exception strings. The set of exception strings and the computational effort for identifying the exception strings can thus be reduced. The initial literal may, for example, identify an initial instruction in a loop within the program.

The set of one or more exception strings may be determined, for example, by comparing one or more candidate substrings of the trace to one or more other substrings of the trace to determine whether the respective candidate substring is unique. For example, to determine whether BC is unique in the trace ABDACDABCD, BC may be compared to all other substrings of this trace. If BC matches one of the other substrings (which is not the case in the present example), BC is not unique; otherwise, BC is unique. This process may involve a considerable computational effort. The effort may increase as $N^2$, where N is the total number of literals in the trace. An example of a systematic approach for determining a set of one or more exception strings is described below in reference to FIG. 3.

Figure 3:
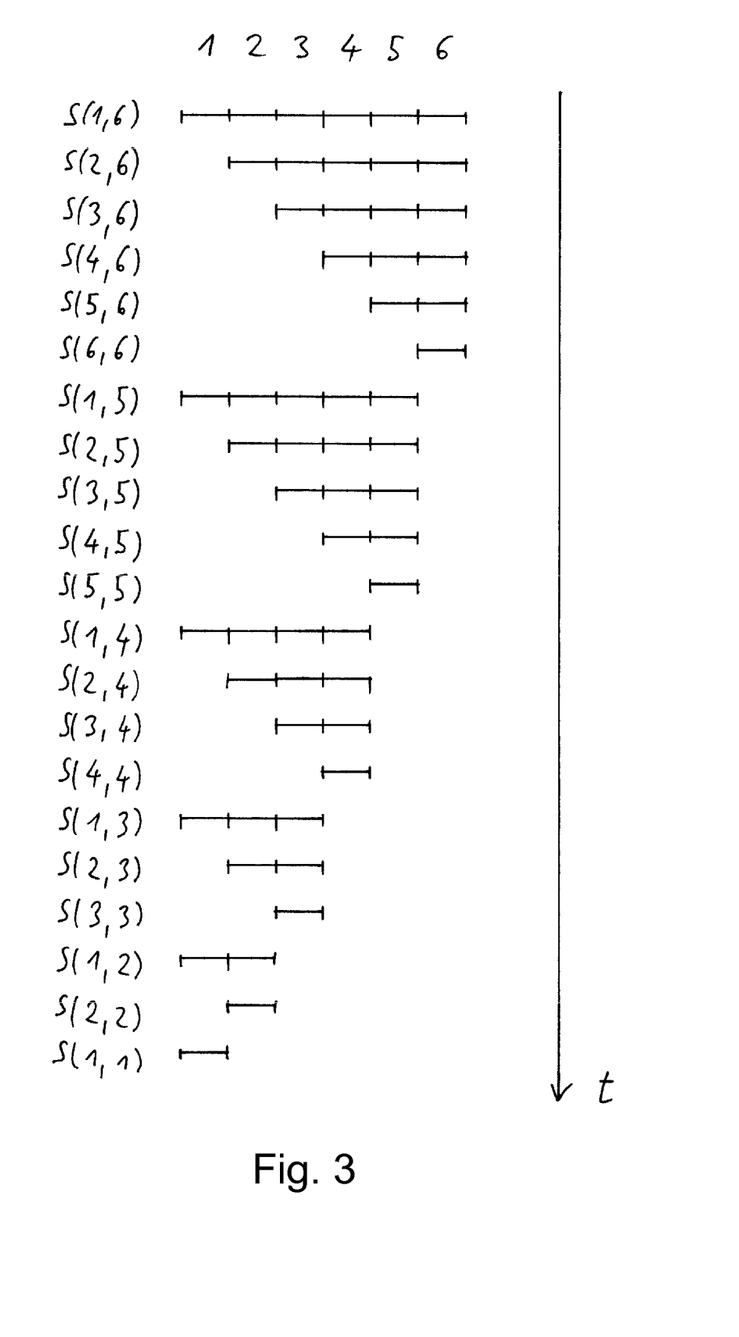
FIG. 3 schematically represents an example of a chronological order in which substrings of a given string may be analyzed.

FIG. 3 schematically illustrates an example of an order in which the various substrings of a given string, for example, the trace, may be examined to find out whether they are unique (i.e., contained only once in the string) or not. In the example, the trace to be analyzed is represented by the string S(1,6). Substrings of the trace are denoted S(I,J), wherein S(I,J) is defined as the substring that starts with the I-th literal and ends with the J-th literal of substring S(1,6). In the figure, each substring is represented by a horizontal line. Each literal of a substring is represented by a horizontal line of length 1. The horizontal line representing a substring is thus composed of horizontal unit lines representing the literals in the respective substrings.

The various substrings may be examined in the order indicated by the list of symbols S(I,J) and the downward arrow representing the flow of time. The procedure may thus start with string S(1,6), i.e., the full trace, and may terminate with substring S(1,1), which consists of the first literal of the trace S(1,6). The indicated order is chosen such that no substring of the trace is tested for uniqueness unnecessarily. In the shown example, this may be achieved by examining a given substring of the trace, e.g., string S(4,4), only if each of the substrings which include the given string of interest, S(4,4) in the present example, as a substring are unique. For instance, in the shown example, string S(4,4) may be tested for uniqueness only after determining that each of the following strings is unique: S(3,4), S(2,4), S(1,4), S(4,5), S(3,5), etc.

In some cases, it may be beneficial to exclude some substrings of the trace from the set of substrings that is examined for uniqueness. The set of substrings among which the exception strings are selected may also be referred to as the set of candidate strings. In other words, the set of one or more exception strings is a subset of the set of one or more candidate strings. The set of candidate strings may comprise all substrings of the trace, but this is not necessarily the case. It may be beneficial to examine the candidate strings in an order such that any given candidate string S(I,J) appears only after the strings S(I−K, J+L), where K and L are non-negative integers with K+I greater or equal to one. In other words, all candidate strings which include the given string S(I,J) as a substring appear before the given string S(I,J).

Such order may, for example, be defined in terms of an outer loop over J from an initial value JMAX down to a final value JMIN and an inner loop over I from an initial value IMIN up to said value J. For example, IMIN=1, JMIN=1, JMAX=N, where N is the length of the trace. Performing the outer loop over J by decreasing J in each cycle means that the trace is searched from the end rather than from the beginning. This order ensures that the exception strings can be found in the inverse order of their appearance in the trace, so that the exception strings near the end of the trace can be found before exception strings near the beginning of the trace. In particular, the ultimate shortest unique substring of the trace can thus be found first. It has been found that the ultimate shortest unique substring of the trace can be a particularly promising candidate for containing a bug causing the exception. Furthermore, this allows terminating the search immediately after finding the ultimate shortest unique substring of the trace. In the latter case, the set of exception strings will contain only the ultimate shortest unique substring of the trace.

Figure 4:
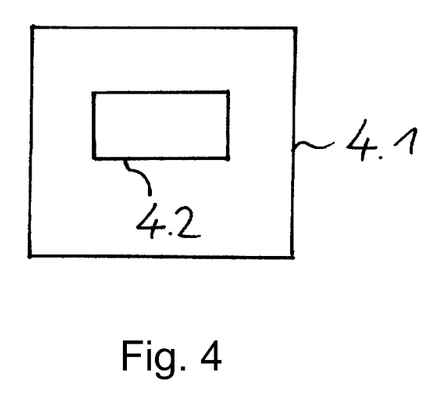
FIG. 4 schematically shows an example of an embodiment of a computer program product.

FIG. 4 schematically shows an example of an embodiment of a computer program product. The product may comprise a transitory or non-transitory storage medium 4.1 with executable instructions 4.2 for instructing a computer (not shown) to perform a debugging method as described above in reference to FIGS. 1, 2, and 3. The storage medium 4.1 may also carry the computer program (not shown) to be debugged. The debugging instructions for implementing the debugging method may be integrated in the computer program. Alternatively, the computer program and the debugging instructions may be separate programs. These separate programs may be provided on the same storage medium or on separate storage media.

The invention may thus be implemented in a computer program for running on a computer system, at least including code portions for performing steps of a method according to the invention when run on a programmable apparatus or enabling a programmable apparatus to perform functions of a device or system according to the invention. In this respect, it should be observed that in the hereinabove the term "computer" has been used to comprise generally any programmable or non-programmable information processing system. An example of a non-programmable computer is a device capable of executing a program, wherein the program is implemented in hardware, such as in a logic circuit or in non-modifiable memory permanently attached to a microprocessor. A programmable information processing system can for example be a mobile phone, an embedded automotive system, a general purpose computer, a network server or other programmable apparatus.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few. The computer program may for example be an integrated development environment (IDE) (also known as integrated design environment, integrated debugging environment or interactive development environment), e.g. a software application that provides comprehensive facilities to computer programmers for software development. The IDE may for example comprise one or more, such as all of the group consisting of: a source code editor, a compiler and/or an interpreter, a build automation tool, a debugger.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense. For example, the computer executing the computer program may be a system comprising multiple components, such as a microprocessor or other logic circuit executing the computer program, memory or otherwise, and that the method does not need to be executed by a single component of the computer. For example, the microprocessor or other logic circuit may execute the computer program, whereas another component monitors the execution and generates the trace and performs the selection.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for debugging a computer program, comprising:
running at least part of said computer program on a computer, thereby prompting said computer to execute a sequence of instructions and to generate a trace corresponding to said executed sequence of instructions; and,
when said program has generated an exception, selecting by said computer a set of one or more exception strings among one or more candidate strings wherein each candidate string is a substring of said trace by successively determining whether each of the candidate strings is unique in an order so that any first candidate string which is a substring of a second candidate string is examined for uniqueness only after determining that the second candidate string is unique, wherein the candidate strings are denoted, the candidate string starting with a I-th literal and ending with a J-th literal of said trace, wherein the order is defined by an outer loop over J from an initial value JMAX down to a final value JMIN and an inner loop over I from an initial value IMIN up to J, where I and J represent integers, so that each of said exception strings is a unique substring of said trace; and
indicating said exception strings to a user or to a debugging tool.

2. The method of claim 1, wherein said set of exception strings includes one or more of the shortest unique substrings of said trace or all shortest unique substrings of said trace.

3. The method of claim 1, wherein said set of exception strings includes the ultimate shortest unique substring of said trace.

4. The method of claim 1, wherein said selecting said set of one or more exception strings is performed on the basis of said trace and on the basis of one or more additional strings, so that none of said exception strings is a substring of any one of said additional strings.

5. The method of claim 1, further comprising:
indicating the order in which said exception strings appear in said trace.

6. The method of claim 1, further comprising:
selecting, for each of said exception strings, a context string, so that the respective exception string is a true substring of the respective context string and the context string is a true substring of said trace; and
indicating said context strings to said user or to said debugging tool.

7. The method of claim 1, wherein said trace comprises a succession of one or more principal substrings, each of said principal substrings starting with an initial literal which is the same for all said principal substrings and which appears in each of said principal substrings only at the beginning of the respective principal substring, wherein each of said one or more exception strings is a substring of one of said principal substrings.

8. The method of claim 7, wherein said computer program comprises a loop and said initial literal identifies an initial instruction in said loop.

9. A method for debugging a computer program, comprising:

running at least part of the computer program on a computer, thereby prompting the computer to execute a sequence of instructions and to generate a trace corresponding to the executed sequence of instructions;

generating an exception in response to detecting an error in the computer program, when the program has generated an exception, selecting by the computer a set of one or more subsequences of instructions of the trace, so that each of the subsequences of instructions is a unique subsequence instruction of the trace by successively determining whether candidate strings are unique in an order so that any first candidate string which is a substring of a second candidate string is examined for uniqueness only after determining that the second candidate string is unique, wherein the candidate strings are denoted, the candidate string starting with a I-th literal and ending with a J-th literal of said trace, wherein the order is defined by an outer loop over J from an initial value JMAX down to a final value JMIN and an inner loop over I from an initial value IMIN up to J, where I and J represent integers; and indicating the set of one or more subsequences of instructions to a user or to a debugging tool.

10. The method of claim 9, further comprising communicating the set of one or more subsequences of instructions to a debugging tool.

11. The method of claim 9, wherein each of the one or more subsequences of instructions comprises one or more shortest unique subsequences of instructions.

12. The method of claim 11, wherein when there are more than one shortest unique subsequences of instructions, indicating an order in which the subsequences of instructions appear in the trace by numbering the more than one shortest unique subsequences of instructions.

13. The method of claim 11, further comprising a context subsequence of instructions, wherein the context subsequence of instructions comprises a shortest unique subsequence of instructions, a preceding literal, and a succeeding literal.

14. The method of claim 9, wherein portions of the program are repetitive, wherein the trace further comprises a succession of one or more principle subsequences, wherein each of the one or more principle subsequences begins with a same literal, and wherein one or more subsequences of instructions that extend across more than one principle subsequence are excludes from the set of one or more subsequences of instructions.

15. The method of claim 9, wherein the program includes one or more loops, and wherein the trace is searchable from either a beginning instruction or from an ending instruction.

\* \* \* \* \*